United States Patent [19]

Backderf

[11] Patent Number: 4,983,665

[45] Date of Patent: Jan. 8, 1991

[54] FLEXIBLE BLEND COMPOSITIONS BASED ON OVERPOLYMERS OF VINYL CHLORIDE POLYMERS ON ETHYLENE COPOLYMERS

[75] Inventor: Richard H. Backderf, Richfield, Ohio

[73] Assignee: The B. F. Goodrich Company, Brecksville, Ohio

[21] Appl. No.: 443,788

[22] Filed: Nov. 30, 1989

Related U.S. Application Data

[63] Continuation of Ser. No. 242,395, Sep. 9, 1988, abandoned.

[51] Int. Cl.$^5$ .................. C08K 31/00; C08G 63/48
[52] U.S. Cl. ........................... 524/533; 524/567; 524/569; 524/556; 525/64; 525/80
[58] Field of Search ............... 524/533, 567, 569; 525/64, 80

[56] References Cited

U.S. PATENT DOCUMENTS

| | | |
|---|---|---|
| 4,605,704 | 8/1986 | Eastman . |
| 4,661,549 | 4/1987 | Walker . |
| 4,752,639 | 6/1988 | Haller et al. .................. 525/64 |

FOREIGN PATENT DOCUMENTS

| | | | |
|---|---|---|---|
| 51-56852 | 4/1976 | Japan .................. | 525/64 |

*Primary Examiner*—Joseph L. Schofer
*Assistant Examiner*—Mark Sweet
*Attorney, Agent, or Firm*—Daniel J. Hudak; Joe A. Powell

[57] ABSTRACT

Flexible blend compositions are provided having a Shore A hardness of less than or equal to about 90. The compositions are blends of an overpolymer and/or graft polymer with a plasticizer or blending agent. The overpolymer has an ethylene copolymer substrate overpolymerized with a vinyl chloride type monomer or comonomer and optionally including an acrylate comonomer. The compositions are distinguished by an absence of shrinkage in hot oil. The compositions generally tend to swell in hot oil.

25 Claims, No Drawings

FLEXIBLE BLEND COMPOSITIONS BASED ON OVERPOLYMERS OF VINYL CHLORIDE POLYMERS ON ETHYLENE COPOLYMERS

CROSS-REFERENCE

This application is a continuation of application Ser. No. 07/242,395 filed Sept. 9, 1988, for "Flexible Blend Compositions Based on Overpolymers of Vinyl Chloride Polymers on Ethylene Copolymers" R. H. Backderf, et al. and now abandoned.

FIELD OF THE INVENTION

The invention relates generally to thermoplastic elastomer blends of an ethylene copolymer overpolymerized with one or more vinyl chloride or vinyl chloride type monomers and optionally an acrylate comonomer blended with a plasticizer or blending agent having a number average molecular weight of equal to or more than 300 for trimellitate plasticizers or equal to or more than 500 for the other plasticizers. The blends do not tend to shrink and generally tend to swell in hot oil as evidenced by an oil swell of from 0 to 300 percent (measured by ASTM D471 using No. 3 oil at 100° C. for 166 hours).

BACKGROUND

U.S. Pat. No. 4,605,704 to Eastman et al and U.S. Pat. No. 4,661,549 to Walker both relate to a graft polymer prepared by reacting an ethylenically unsaturated monomer with a polymer of an olefin of 2 to 8 carbon atoms. In a preferred embodiment of each patent, a vinyl halide polyolefin graft polymer is produced. However, these systems are generally rigid and have high flexural modulus, especially at low temperatures. These compositions have had limited applications since they cannot be used in the production of flexible parts. Generally known flexible polyvinyl chloride compositions have a tendency to shrink upon exposure to hot oil. In contrast, the present compositions have different hot oil characteristics and improved low temperature flexibility and therefore can be used for new applications.

SUMMARY OF THE INVENTION

The blend compositions of the present invention are soft, flexible compositions prepared by blending plasticizers or blending agents with an overpolymer and/or graft polymer of polyvinyl chloride on an ethylenic polymer.

It has been heretofore unknown to blend the plasticizer with the overpolymers and/or graft polymers of the present invention in order to produce a soft, flexible composition which mitigates the problem of plasticizer migration, and in fact may even swell upon exposure to oil.

The compositions of the present invention are useful for the following applications: shower door gaskets, window gaskets, automotive gaskets, and refrigerator gaskets, as well as other gaskets on painted surfaces; oil resistant hoses; car interiors, floor mats, mud flaps, automotive roofing, side strips and trim; dual durometer extrusions; small tires, conveyor belts; food wrap and clear flexible packaging; swimming pool liners; marine covers; tarpaulins; shower curtains; wallcoverings; table covers; flooring products; greenhouse film; shoes; conduit; connectors for tubing; wire and cable jacketing; tool handles; toys; blood bags; and intravenous bags.

DETAILED DESCRIPTION OF THE INVENTION

The non-migrating blend compositions of the present invention comprise one or more plasticizers or blending agents blended with a graft and/or overpolymer of vinyl chloride onto an ethylene copolymer. These compositions have a Shore A hardness of equal to or less than about 90; and preferably equal to or less than about 85; and most preferably equal to or less than about 80.

The graft and/or overpolymer comprises a base or substrate copolymer onto which is copolymerized in the sorbed or dissolved state a graft polymer component or overpolymer segment comprising a vinyl chloride monomer or monomers. This results in a graft and/or overpolymer which is used herein to mean a state in which a certain amount of intermolecular interaction occurs between the copolymer and the graft polymer components or overpolymer segments which at least represents solvation forces and in some instances may rise to the level of bonding. Thus, to a certain extent, a discrete continuous core of the substrate copolymer may exist with interspersed associated segments of the graft or overpolymer components.

The base or substrate comprises from about 10 to about 90 percent; and preferably from about 15 to about 75 percent; and most preferably from about 15 to about 60 percent by weight based on total weight of the graft and/or overpolymer. This base comprises an ethylene polymer selected from the group comprising polyethylene or copolymers of ethylene with acrylic esters, methacrylic esters, or vinyl esters having from 1 to about 18 carbon atoms in the ester substituent, and preferably from 1 to about 8 carbon atoms in the ester substituent, or monoolefins having from 2 to 18 carbon atoms and preferably 2 to 8 carbon atoms, or carbon monoxide, or combinations thereof. Specifically preferred copolymers include ethylene vinyl acetate, ethylene ethyl acrylate, ethylene methyl acrylate, ethylene vinyl acetate carbon monoxide, and the like.

The grafted polymer component or overpolymer segments comprise 10 to 90 percent; and preferably from 25 to 85 percent; and most preferably from 40 to 85 percent by weight based on the total overpolymer weight. This polymer component or segment comprises one or more vinyl chloride type monomers and optionally an acrylate comonomer. By "vinyl chloride type monomer" it is meant a vinyl chloride monomer and one or more optional vinyl component comonomers.

The amount of the optional vinyl component units in the graft component or overpolymer segment is from about 0 to about 45 parts by weight with from about 0 to about 20 parts by weight being preferred. In other words, the vinyl chloride constituent can contain up to 50 percent thereof and preferably up to 22 percent thereof by weight of the vinyl component unit. By the term "vinyl component", it is meant a vinyl unit other than vinyl chloride. Such units are well known to the art and to the literature and are derived from vinyl esters wherein the ester portion contains from 1 to 18 carbon atoms such as vinyl acetate; vinylidene chloride; 1,2-dichloroethylene; styrene and styrene derivatives having a total of from 8 to 15 carbon atoms such as alphamethylstyrene, vinyl toluene, chlorostyrene, chloromethylstyrene; vinyl naphthalene; diolefins having a total of from 4 to 18 carbon atoms such as butadiene, isoprene, including halogenated diolefins such as chloroprene; monoolefins having a total of from 2 to 18 carbon atoms and preferably 2 to 4 carbon atoms; carbon monoxide; and the like. Vinyl acetate is a preferred vinyl component monomer which, upon polymerization, becomes a vinyl component unit.

The graft component or overpolymer segment comprises from 10 to about 100 percent by weight of the vinyl chloride type monomer or monomers. The remainder comprises an acrylate comonomer.

The one or more acrylate units contained in the polyvinyl chloride-acrylate graft component or overpolymer segment has the formula, before polymerization,

FORMULA I wherein $R^1$ is an aromatic, an aliphatic (especially an alkyl), or combinations thereof, having from 1 to 18 carbon atoms, or a halogen derivative thereof, desirably is methyl, and preferably is hydrogen. $R^2$ is an aliphatic group, especially an alkyl, an aromatic, an alkyl hydroxyl, or combinations thereof, having from 1 to 18 carbon atoms, desirably from 2 to 10 carbon atoms, and preferably from 2 to 8 carbon atoms, or a halogen derivative thereof; or $R^2$ is a hydrocarbyl ether such as alkoxyalkyl, a phenoxyaryl, or a phenoxyalkyl, or combinations thereof having from 2 to 1,000 carbon atoms, desirably from 2 to 18 carbon atoms, and preferably from 2 to 8 carbon atoms, or a substituted halogen, oxygen, nitrogen, or sulfur derivative thereof. Examples of specific acrylate monomers include ethyl acrylate, propyl acrylate, butyl acrylate, hexyl acrylate, octyl acrylate, 2-ethylhexyl acrylate, nonyl acrylate, decyl acrylate, phenyl acrylate, nonylphenyl acrylate, ethyl methacrylate, butyl methacrylate, hexyl methacrylate, 2-ethylhexyl methacrylate, methoxymethyl acrylate, methoxyethyl acrylate, ethoxyethyl acrylate, butoxyethyl acrylate, ethoxypropyl acrylate, 2(2-ethoxyethoxy)ethyl acrylate, and the like. Especially preferred acrylate monomers include butyl acrylate, 2-ethylhexyl acrylate, ethyl acrylate, and the like. As noted hereinabove, the $R^2$ group can be a hydrocarbyl ether group. That is, it can be an ether, a diether, or a multiple ether of an alkyl, an aryl, or combinations thereof, such as an alkoxyalkyl, a phenoxyaryl, a phenoxyalkyl, and the like, generally having from 2 to 1,000 carbon atoms, desirably from 2 to 18 carbon atoms, and preferably from 2 to 8 carbon atoms, or combinations thereof. Examples of specific alkoxyalkyl acrylates include methoxymethyl acrylate, butoxyethyl acrylate; ethoxypropyl acrylate, methoxyethyl acrylate, ethoxyethyl acrylate, 2(2-ethoxyethoxy)ethylacrylate, and the like. Examples of specific phenoxyalkyl acrylates include 2-phenoxylethylacrylate and 2-phenoxyethylmethacrylate. In addition to the above $R^2$ ether groups, halogen, oxygen, nitrogen, or sulfur derivatives of such hydrocarbyl ether groups can also be utilized. For example, $R^2$ can be an alkoxyalkyl containing at least one halogen therein in lieu of a hydrogen atom.

The graft component or overpolymer segment desirably is not crosslinked so that it has good processing properties. However, it is to be understood that it is within the ambit of the present invention to either partially crosslink or crosslink the graft component or overpolymer segment to provide improved physical properties. Should the graft component or overpolymer segment be crosslinked or cured, any conventional crosslinking comonomer can be utilized such as diallyl phthalate, various diacrylates such as butanediol diacrylate, diethylene glycol diacrylate, and the like.

The ethylene polymer substrate can be overpolymerized using the above-noted monomers in any conventional manner such as emulsion, mass, solution, dispersion, and the like with suspension being preferred. The substrate is generally used in the form of solid particles of less than 0.25 inch diameter and preferably in powder form. Alternatively, the substrate can be dissolved in the monomers. Generally, polymerization is initiated with a free radical initiator such as an alkanoyl, aroyl, alkaroyl, or an aralkanoyl diperoxide, a monohydroperoxide, or an azo compound, a peroxy ester, a percarbonate, or any other suitable free radical-type initiator. Examples of specific initiators include benzoyl peroxide, lauroyl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-t-butyl perphthalate, diisopropyl peroxydicarbonate, acetyl cyclohexane sulfonyl peroxide, disecondary butyl peroxydicarbonate, t-butyl peroxyneodecanoate, dinormal propyl peroxydicarbonate, azo-bisisobutyronitrile, alpha, alpha'-azodiisobutyrate, 2,2'-azo-bis-(2,4-dimethyl valeronitrile), and the like. Polymerization can be carried out at suitable temperatures with temperatures of from about 0° to 100° C. being desired, preferably from 10° to 70° C., and from about 40° to about 70° C. being most preferred. The amount of the initiator utilized is generally quite small as from about 0.005 parts by weight to about 1.0 parts by weight and preferably from about 0.01 to about 0.1 parts by weight for every 100 parts by weight of the total monomers being copolymerized.

A reaction medium, which is preferably water, is added to a reaction vessel. From about 130 to about 190, and preferably from about 140 to about 160 parts of medium per 100 parts total of monomer are added to the reaction vessel. The substrate polymer is added to the vessel. The vessel is evacuated. The appropriate monomers are charged in the appropriate ratios into the vessel. Initiators are added and dispersants or suspending agents may be added which will cause or aid in the polymerization of the monomers. The reaction is run at a temperature of about 40° to about 70° C.

It may be advantageous to add a small amount of dispersant to the liquid reaction media. The purpose of the dispersant is to obtain a more complete and uniform dispersal of the monomers and initiator throughout the reaction media prior to and during the polymerization of the monomers. Any of the well known dispersants operative in aqueous medium can be employed. These include among others, methyl cellulose, hydroxyl propyl methyl cellulose, polyvinyl alcohol, dodecylamine hydrochloride, sodium lauryl sulfate, dodecyl benzene sulfonate, lauryl alcohol, sorbitan monolaurate, polyoxyethylene, nonylphenoxy polyoxyethylene ethanol, hydrolyzed polyvinyl acetates, polyacrylic acid polymers, polyethylene oxide containing surfactants and non-polyethylene oxide containing surfactants, etc. The amount of dispersant employed will be in the range of about 0.01 percent to about 1.0 percent by weight, based on the total weight of the monomers, to give satisfactory results. Preferably, however, the dispersant is employed in the range of about 0.02 to about 0.4 percent by weight.

In order to facilitate temperature control during the polymerization process, the reaction medium is kept in contact with cooling surfaces cooled by water, brine, evaporation, etc. This is accomplished by employing a jacketed polymerization reactor wherein the cooling materials are circulated through the jacket throughout the polymerization reaction. This cooling is necessary since most all of the polymerization reactions are exothermic in nature. It is understood, of course, that a heating medium can be circulated through the jacket, if necessary.

In order to achieve the favorable Shore A hardness and the non-migration or oil swell characteristics of the blend compositions of the present invention, the overpolymers are blended with a wide variety of blending agents or plasticizers having a number average molecular weight of greater than or equal to about 500, and preferably greater than or equal to about 800, and most preferably greater than or equal to about 1,000. The term blending agents is used broadly and could include compositions which are plasticizers, i.e., which tend to soften the overpolymer or graft polymers. These plasticizers or blending agents preferably include acrylonitrile-butadiene copolymers, polybutadienes, polyesters, polyacrylates, paraffin waxes, chlorinated polyolefins and oxidized polyolefins having a monomeric unit having from 1 to about 18 carbon atoms, polyvinyl esters having an ester portion having from 1 to about 18 carbon atoms, polyepichlorohydrin and copolymers thereof, citric acid derivatives, polystyrene and derivatives thereof, glycol derivatives, ethylene copolymers, and petroleum derivatives, all having a number average molecular weight of greater than or equal to 500, and preferably greater than or equal to 800, and most preferably greater than or equal to 1,000; and trimellitates having a molecular weight of greater than or equal to 300; and preferably greater than or equal to 400; and most preferably greater than or equal to 500.

The plasticized overpolymers or graft polymers of the present invention can also contain conventional additives in conventional amounts. Thus, various heat stabilizers such as barium/cadmium compounds, lead compounds, calcium/zinc compounds, and organotin compounds, various conventional lubricants such as paraffin, polyethylene, stearic acid, various processing aids such as polyacrylates, various antioxidants such as BHT, that is butylated hydroxy toluene, BHA, that is butylated hydroxy anisole, various hindered phenols, various UV inhibitors such as substituted benzophenones, and the like, can be utilized.

Various fillers and pigments can also be utilized in conventional amounts such as up to about 200 or 300 parts by weight for every 100 parts by weight of the overpolymer or graft polymer. Examples of fillers include calcium carbonate, clay, silica, the various silicates, talc, carbon black, and the like. Such fillers are generally added in high amounts as from about 10 to about 200 parts by weight for every 100 parts by weight of the overpolymer or graft polymer. Examples of various pigments include titanium dioxide, carbon black, and the like. Generally, the amount of such pigment is not as large as the amount of the fillers.

The various additives, fillers, pigments, and the like, along with the plasticizers/blending agents are generally added and blended in any conventional manner. For example, the overpolymer or graft polymer can be blended with the various additives in a Banbury mixer and then processed on a two-roll mill to produce a sheet which can be cubed and then extruded, injection molded, etc. The overpolymer or graft polymer can also be mixed with the various additives in a high intensity mixer such as a Henschel mixer and then this powder compound can be processed on a two-roll mill into a sheet and cubed or the powder compound can be processed on an extruder into pellets or into the finished article. In general, any conventional means of compounding such as a Banbury mixer, two-roll mill, extruder, injection molding machine, etc., can be used to produce the products of this invention.

The plasticizers or blending agents are used in amounts of from about 20 to about 300 parts, and preferably from about 40 to about 200; and most preferably from about 50 to about 150 parts by weight per 100 parts of the overpolymer. The resulting blend compositions are flexible and soft, having a Shore A hardness of less than or equal to about 90; and preferably less than or equal to about 85; and most preferably less than or equal to about 80. Further, the resulting blend compositions are generally "non-migrating" meaning that the plasticizers do not tend to migrate out of the system. This tendency is characterized by the fact that the compositions do not shrink when subjected to oil swell testing and, in fact, may even swell. The compositions have oil swell values of 0 to about 300 percent, and preferably from 0 to about 200 percent as measured by ASTM D471 using No. 3 oil at 100° C. for 166 hours. Further, the compositions have favorable low temperature flexibility as shown by ClashBerg modulus at minus 35° C. of less than 200,000; and preferably less than 150,000; and most preferably less than 100,000.

The invention will be better understood by reference to the following examples.

EXAMPLE 1

The recipe used to prepare an overpolymer of composition 48.5 EEA/51.5 VCl, follows for the following recipe:

| Materials | Wt., g |
| --- | --- |
| EEA* | 800 |
| Water | 3200 |
| Vinyl chloride monomer | 700 |
| Peroxy initiator (75% active) | 1 |
| Polyvinyl alcohol dispersant | 0.56 |
| Cellulose dispersant | 0.56 |
| Substituted polyvinyl alcohol dispersant Meter | 1.12 |
| Vinyl chloride monomer | 424 |

*EEA is Union Carbide "DPD-6169 Natural", a copolymer of ethyl acrylate and ethylene.

The reaction was run in a 5 liter reactor at 60° C. with agitation. The EEA, water and substituted cellulose dispersant solution were charged into the reaction vessel. The vessel was evacuated and nitrogen introduced three times. The nitrogen was evacuated and 700 g of vinyl chloride monomer was added. The initiator was injected and the mixture stirred at room temperature. The stirring rate was increased for three hours and then maintained at a slower speed overnight. In the morning, the speed was increased while the temperature was brought to 60° C. After 90 minutes at 60° C., vinyl chloride was added every hour until a total of 424 grams had been added. The reaction was run for seven hours, cooled and blown down. The resulting pellets were washed with water, dried and stripped on trays to a constant weight in a vacuum oven at 55° C.

EXAMPLE 2

In a like manner, 50 g of EEA was sorbed with a solution of vinyl chloride monomer, 2-ethylhexyl acrylate (EHA) and peroxy initiator. The mixture was tumbled at 30° C. in the absence of $O_2$, then at 50° C., and finally at 55° C. for a total of 40 hours. The overall composition of the overpolymer was:
EEA 36.1%
VCl 35.0
EHA 28.9
The VCM conversion was 80.7%. This polymer is designated as polymer A. Some properties of polymer A had a Shore A hardness of 80.

EXAMPLE 3

The polymerization vessel was charged with the following ingredients:

| | |
|---|---|
| Water | 31158 g |
| Vinyl chloride | 13684 g |
| Ethylene vinyl acetate carbon monoxide terpolymer | 3910 g (Elvaloy 741, a trademark of DuPont Corporation) |
| Stabilizer | 178 g |
| Polyvinyl alcohol dispersant (1) | 423 g (5.04% wt water solution) |
| Polyvinyl alcohol dispersant (2) | 182 g (4.87% wt water solution) |
| Substituted cellulose dispersant | 536 g (1.99% wt water solution) |
| Initiator | 5.69 g |

The vessel was first charged with water followed by the ethylene vinyl acetate carbon monoxide terpolymer and the dispersants. After evacuation, the mixture of vinyl chloride monomer and the stabilizer was added. The content of the vessel was then agitated for 60 min. at 61° C. After that time, the initiator was added and the polymerization started and was continued for 450 min. The polymerization was stopped by the addition of a short-stop. The vessel was then cooled to room temperature and the polymer was transferred to a stripping vessel to remove the unreacted monomer. After the stripping, the polymer was recovered by filtration and dried. This polymer is designated polymer B.

EXAMPLE 4

The polymerization vessel was charged with the following ingredients:

| | |
|---|---|
| Water | 31158 g |
| Vinyl chloride | 13685 g |
| Ethylene vinyl acetate copolymer | 3910 g (Vynathene EY905, a trademark of USI Corp.) |
| Stabilizer | 178 g |
| Polyvinyl alcohol dispersant (1) | 423 g (5.04% wt water solution) |
| Polyvinyl alcohol dispersant (2) | 182 g (4.87% wt water solution) |
| Substituted cellulose dispersant | 536 g (1.99% wt water solution) |
| Initiator | 5.69 g |

The polymerization was carried out in a similar manner as described in Example 3. This polymer is designated polymer C.

EXAMPLE 5

The polymerization vessel was charged with the following ingredients:

| | |
|---|---|
| Water | 31158 g |
| Vinyl chloride | 13685 g |
| Ethylene vinyl acetate carbon monoxide terpolymer | 3910 g (Elvaloy 742, a trademark of DuPont Corporation) |
| Stabilizer | 178 g |
| Polyvinyl alcohol dispersant (1) | 423 g (5.04% wt water solution) |
| Polyvinyl alcohol dispersant (2) | 182 g (4.87% wt water solution) |
| Substituted cellulose dispersant | 536 g (1.99% wt water solution) |
| Initiator | 5.69 g |

The polymerization was carried out in a similar manner as described in Example 3. This polymer is designated polymer D.

EXAMPLE 6

The polymerization vessel was charged with the following ingredients:

| | |
|---|---|
| Water | 27226 g |
| Vinyl chloride | 9538 g |
| Ethylene vinyl acetate copolymer | 7804 g (Levapren 450, a trademark of Bayer) |
| Polyvinyl alcohol dispersant (1) | 516 g (5.04% wt water solution) |
| Polyvinyl alcohol dispersant (2) | 178 g (4.87% wt water solution) |
| Substituted cellulose dispersant | 610 g (1.99% wt water solution) |
| Initiator | 5.09 g |

The vessel was first charged with water followed by the ethylene-vinyl acetate copolymer and the dispersants. After evacuation and the start of agitation, the vinyl chloride monomer was added. The contents of the vessel were then agitated at 65° C. After a time, temperature was reduced to 60° C. Then the polymerization was started by addition of the initiator and continued for about three hours. The polymerization was then stopped by the addition of a short-stop. The vessel was then cooled to room temperature and the polymer was transferred to a stripping vessel to remove the unreacted vinyl chloride. After the stripping, the polymer was recovered by filtration and dried.

EXAMPLE 7

Using a resin similar to that described in Example 2, the blends listed in Table I were prepared. These blends, except the DOP plasticized control, were prepared by mixing the ingredients in a laboratory size (BR size) Banbury mixer for five minutes and dropping from the Banbury at the indicated stock temperatures. These compounds were then milled on a two-roll laboratory size mill for five minutes after banding to give stock temperatures of 310o to about 320° F. The products were then removed from the mill as a sheet and cut into 6"×6" plaques. The plaques were pressed using a five minute preheat and five minute press time at 350° F. and submitted for physical testing.

The results in Table I indicate that the polymer based on the overpolymerization of vinyl chloride and 2-ethylhexyl acrylate, onto an ethylene/ethylacrylate copolymer, although being relatively soft, does not tend to shrink when tested in hot oil and has excellent low temperature properties. Also, blends of this polymer with other modifying materials can easily be made to give products with both lower and higher hardness values, reduced oil swell in hot oil and good low temperature brittleness properties. In contrast, the di-2-ethylhexyl phthalate plasticized control showed significant shrinkage in the hot oil test.

as given in Table II. The blends were mixed on a heated 6"×13" two-roll laboratory mill for 8 minutes after banding to give stock temperatures in the 280° to 350° F. range. The compounds were then removed as a sheet and cut into 6"×6" plaques and pressed using a 5 minute preheat and 5 press time at 320° F. The pressed plaques were then submitted for physical testing.

The results in Table II indicate that blends with good to excellent tensile properties, generally acceptable low temperature brittleness properties, low plasticizer migration as demonstrated by no shrinkage when exposed to hot ASTM #3 oil and for many of the blends oil swell greater than 0 and less than 100 percent and hardness values equal to or below 91 Shore A can be achieved by blending a polymer modifying material with a vinyl chloride based overpolymer.

TABLE I[1]

| | | | | |
|---|---|---|---|---|
| PVC Homopolymer Resin (1.02 inherent viscosity) | 100[2] | — | — | — |
| Di-2-ethylhexyl phthalate(DOP) | 90 | — | — | — |
| Polymer A | — | 100 | 100 | 100 |
| Nitrile-butadiene copolymer[3] | — | — | 50 | — |
| Impact modifier[4] | — | — | — | 50 |
| Hardness Shore A | 64 | 68 | 60 | 82 |
| Tensile Strength (psi) | 1590 | 1010 | 1100 | 1420 |
| Brittleness Temperature (°C.) | −45.5 | −56.5 | −47 | −47.5 |
| ASTM D746 | 5000 | 36600 | 78200 | 38100 |
| Clash-Berg Modulus at −35° C. (psi) | | | | |
| Oil Resistance - % Volume Swell ASTM D-471, ASTM #3 Oil 100° C./166 hrs. | −33 | 282 | 168 | 167 |

[1]Compounds also contain - stabilizer 5, costabilizer 3, filler 8, lubricant 0.2 and antioxidant 0.5.
[2]Compound was prepared by mixing on a heated two-roll mill for 5 minutes after banding and then pressed and tested in a manner similar to the other materials. Compound also contains - stabilizer 5, costabilizer 3, filler 8 and lubricant 0.5.
[3]HYCAR 1422 from B. F. Goodrich Co.
[4]KM334 impact modifier from Rohm and Haas Co.

EXAMPLE 8

Blends of the three resins described in Examples 2, 3 and 4 were prepared using a variety of blending agents

TABLE II[1]

| | | | | |
|---|---|---|---|---|
| Polymer B | 100 | 100 | 100 | 100 |
| Polymer C | — | — | — | — |
| Polymer D | — | — | — | — |
| Elvaloy 741[2] | 50 | — | — | — |
| Elvaloy 742[2] | — | 50 | — | — |
| Levaprene KL324-18[3] | — | — | — | — |
| Hycar 1452 × 8[4] | — | — | 50 | — |
| Polyester Plasticizer[5] | — | — | — | 50 |
| Polyester Plasticizer[6] | — | — | — | — |
| Hardness Shore A | 89 | 85 | 86 | 73 |
| Tensile Strength (psi) | 1240 | 1340 | 1050 | 950 |
| Brittleness temperature (°C.) ASTM D-746 | −13 | −19 | −17 | −16 |
| Clash-Berg Modulus at −35° C. (psi) | 144400 | 132500 | 94700 | 84000 |
| Oil Resistance - % Volume Swell, ASTM D471, ASTM #3 Oil | 31 | 32 | 18 | 10 |
| Polymer B | 100 | — | — | — |
| Polymer C | — | 100 | 100 | 100 |
| Polymer D | — | — | — | — |
| Elvaloy 741[2] | — | 50 | — | — |
| Elvaloy 742[2] | — | — | 50 | — |
| Levaprene KL324-18[3] | — | — | — | 50 |
| Hycar 1452 × 8[4] | — | — | — | — |
| Polyester Plasticizer[5] | — | — | — | — |
| Polyester Plasticizer[6] | 50 | — | — | — |
| Hardness Shore A | 73 | 91 | 88 | 89 |
| Tensile Strength (psi) | 940 | 1820 | 1550 | 760 |
| Brittleness temperature (°C.) ASTM D-746 | −4 | −17 | −22.5 | −12 |
| Clash-Berg Modulus at −35° C. (psi) | 202450 | 148000 | 138600 | 200100 |
| Oil Resistance - % Volume Swell, ASTM D471, ASTM #3 Oil | 8 | 39 | 44 | 35 |
| Polymer B | — | — | — | — |

TABLE II[1]-continued

| | | | | |
|---|---|---|---|---|
| Polymer C | 100 | 100 | 100 | — |
| Polymer D | — | — | — | 100 |
| Elvaloy 741[2] | — | — | — | 50 |
| Elvaloy 742[2] | — | — | — | — |
| Levaprene KL324-18[3] | — | — | — | — |
| Hycar 1452 × 8[4] | 50 | — | — | — |
| Polyester Plasticizer[5] | — | 50 | — | — |
| Polyester Plasticizer[6] | — | — | 50 | — |
| Hardness Shore A | 90 | 78 | 81 | 89 |
| Tensile Strength (psi) | 1500 | 940 | 1070 | 1500 |
| Brittleness temperature (°C.) ASTM D-746 | −24 | −5.5 | −2 | −5.5 |
| Clash-Berg Modulus at −35° C. (psi) | 154400 | 130900 | 140700 | 139600 |
| Oil Resistance - % Volume Swell, ASTM D471, ASTM #3 Oil | 27 | 22 | 22 | 31 |
| Polymer B | — | — | | |
| Polymer C | — | — | | |
| Polymer D | 100 | 100 | | |
| Elvaloy 741[2] | — | — | | |
| Elvaloy 742[2] | — | — | | |
| Levaprene KL324-18[3] | — | — | | |
| Hycar 1452 × 8[4] | 50 | — | | |
| Polyester Plasticizer[5] | — | — | | |
| Polyester Plasticizer[6] | — | 50 | | |
| Hardness Shore A | 86 | 73 | | |
| Tensile Strength (psi) | 1170 | 1050 | | |
| Brittleness temperature (°C.) ASTM D-746 | −19.5 | −7.5 | | |
| Clash-Berg Modulus at −35° C. (psi) | 123900 | 162200 | | |
| Oil Resistance - % Volume Swell, ASTM D471, ASTM #3 Oil | 19 | 9 | | |

[1]Compound also contained - stabilizer and costabilizers 7.65, filler 75, pigment 1.5, lubricants and processing aid 2.7, fungicide 1.4.
[2]Terpolymer of ethylene, vinyl acetate and carbon monoxide from E. I. DuPont DeNemours and Co.
[3]Copolymer of ethylene and vinyl acetate containing 60% vinyl acetate from Mobay Chemical Corp.
[4]Nitrile-butadiene copolymer produced by B. F. Goodrich Co.
[5]Drapex 334F Plasticizer from Witco Corp.
[6]Drapex 411 from Witco Corp.

While in accordance with the Patent Statutes, the best mode and preferred embodiment has been set forth, the scope of the invention is not limited thereto, but rather by the scope of the attached claims.

What is claimed is:

1. A flexible blend composition, comprising:
   (a) 100 parts by weight of a graft polymer or overpolymer comprising
   (1) from about 10 to about 90 percent by weight of the graft polymer or overpolymer of an ethylene copolymer substrate selected from the group consisting of polyethylene or copolymers of ethylene with acrylic esters, methacrylic esters, or vinyl esters wherein said ester substituent has from 1 to about 18 carbon atoms, or monoolefins having from 2 to about 18 carbon atoms, overpolymerized in the sorbed state with
   (2) a vinyl chloride monomer and optionally one or more vinyl component comonomers to produce a homopolymer or copolymer in an amount of from about 10 percent to about 90 percent by weight of the graft polymer or overpolymer,
   said graft polymer or overpolymer being blended with
   (b) from about 20 to about 300 parts by weight of a plasticizer or blending agent based on 100 parts of the overpolymer, said plasticizer or blending agent having a number average molecular weight of equal to or greater than 300 and
   wherein said blend composition has an oil swell measured by ASTM D471 using No. 3 oil of from about 0 to about 300 percent at 100° C. for 166 hours.

2. A blend composition as set forth in claim 1, wherein said composition has a Shore A hardness of less than or equal to 85.

3. A blend composition as set forth in claim 2, wherein said composition has a Shore A hardness of less than or equal to 80.

4. A blend composition as set forth in claim 1, wherein said overpolymer comprises from about 15 to about 75 percent substrate and from about 25 to about 85 percent of the graft component or overpolymer segment, said percentages being based on the total weight of the overpolymer.

5. A blend composition as set forth in claim 1, wherein said overpolymer comprises from about 15 to about 60 percent substrate and from about 40 to about 85 percent of the graft component or overpolymer segment, said percentages being based on the total weight of the overpolymer.

6. A blend composition as set forth in claim 5, wherein said graft component and/or overpolymer segment has about 50 percent or more by weight of the component and/or segment comprised of said acrylate monomer or monomers.

7. A blend composition as set forth in claim 6, wherein $R^1$ is methyl or hydrogen, wherein $R^2$ is an alkyl having from 2 to 10 carbon atoms, or an alkoxyalkyl, a phenoxyaryl, or a phenoxyalkyl, having from 2 to 18 carbon atoms, or combinations thereof.

8. A blend composition as set forth in claim 7, wherein the graft component and/or overpolymer segment includes an acrylate selected from the group consisting of 2-ethylhexyl acrylate, butyl acrylate, ethyl acrylate, and 2-(2-ethoxyethoxy)ethyl acrylate.

9. A blend composition as set forth in claim 8, wherein said plasticizer or blending agent comprises from about 40 to about 200 parts by weight per 100 parts by weight of overpolymer.

10. A blend composition as set forth in claim 9, wherein said plasticizer comprises from about 50 to about 150 parts by weight per 100 parts by weight of overpolymer.

11. A blend composition as set forth in claim 10, wherein said plasticizer is one or more plasticizer selected from the group consisting of acrylonitrile butadiene copolymers, polybutadiene, polyester, paraffin waxes, chlorinated polyolefins produced from monomers having from 1 to about 18 carbon atoms, oxidized polyolefins produced from monomers having from 1 to about 18 carbon atoms, polyvinyl esters having an ester portion having from 1 to about 18 carbon atoms, and polyacrylates, polyepichlorohydrin and copolymers thereof, citric acid derivatives, polystyrene and derivatives thereof, glycol derivatives and petroleum derivatives, all having a number average molecular weight of greater than or equal to 500, and trimellitates having a molecular weight of greater than or equal to 300.

12. A blend composition as set forth in claim 11, wherein said plasticizer has a number average molecular weight of greater than or equal to 800, unless it is a trimellitate in which case it has a molecular weight of greater than or equal to 400.

13. A blend composition as set forth in claim 12, wherein said plasticizer has a number average molecular weight of greater than or equal to 1,000, unless it is a trimellitate in which case it has a number average molecular weight of greater than or equal to 500.

14. A blend composition as set forth in claim 7, wherein said ethylene copolymer substrate is produced from an ester containing comonomer having from 4 to about 11 carbon atoms.

15. A blend composition as set forth in claim 14, wherein said ethylene copolymer substrate is selected from the group comprising ethylene-vinyl acetate copolymers, ethylene-ethyl acrylate copolymers, and ethylene-methyl acrylate copolymers.

16. A flexible blend composition comprising:
(A) 100 parts by weight of a graft polymer or overpolymer comprising:
(1) from about 10 to about 90 percent by weight of the overpolymer or the graft polymer of an ethylene copolymer substrate selected from the group consisting of polyethylene or copolymers of ethylene with acrylic esters, methacrylic esters, or vinyl esters wherein said ester substituent has from 1 to about 18 carbon atoms, or monoolefins having from 2 to about 18 carbon atoms, overpolymerized with
(2) two or more monomers forming a graft segment, the amount of said graft segment being from about 10 percent to about 90 percent by weight of the overpolymer or the graft polymer, said graft segment made from more than 10 percent by weight of a vinyl chloride polymer or copolymer made from a vinyl chloride monomer, and optionally one or more vinyl component comonomers, and up to about 90 percent by weight of an acrylate monomer of the formula

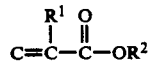

wherein $R^1$ is an aromatic, an aliphatic, or combinations thereof, having from 1 to 18 carbon atoms, or a halogen derivative thereof, or hydrogen; and $R^2$ is hydrogen or an aliphatic, an aromatic, an alkyl hydroxyl, or combinations thereof, or a halogen derivative thereof having from 1 to 18 carbon atoms; or a hydrocarbyl ether such as an alkoxyalkyl, a phenoxyaryl or a phenoxyalkyl or combinations t hereof, or a substituted halogen, oxygen, nitrogen, or sulfur derivative thereof having from 2 to 1,000 carbon atoms; and
(B) from about 20 to about 300 parts byw eight per 100 parts by weight of the overpolymer of a plasticizer or blending agent having a number average molecular weight of equal to or greater than 300.

17. A blend composition as set forth in claim 6, wherein said blend composition has an oil swell measured by ASTM D471 using No. 3 oil of from 0 to about 200 percent at 100° C. for 166 hours.

18. A blend of composition as set forth in claim 17, wherein said blend composition has an oil swell measured by ASTM D471 using No. 3 oil of from 0 to about 100 percent at 100° C. for 166 hours.

19. A blend composition as set forth in claim 16, wherein said blend composition has a Clash-Berg modulus at minus 35° C. less than 200,000.

20. A blend composition as set forth in claim 19, wherein said blend composition has a Clash-Berg modulus at minus 35° C. less than 150,000.

21. A blend composition as set forth in claim 1, wherein said graft copolymer or overpolymer segment is not crosslinked.

22. A flexible blend composition, comprising:
(a) 100 parts by weight of a graft polymer or overpolymer comprising
(1) from about 10 to about 90 percent by weight of the graft polymer or overpolymer of an ethylene copolymer substrate selected from the group consisting of polyethylene or copolymers of ethylene with acrylic esters, methacrylic esters, or vinyl esters wherein said ester substituent has from 1 to about 18 carbon atoms, or monoolefins having from 2 to about 18 carbon atoms, overpolymerized with
(2) a graft component or overpolymer segment comprising from 10 to about 100 percent by weight of the component or segment of a vinyl chloride monomer and optionally one or more vinyl component comonomers,
said graft polymer or overpolymer being blended with
(b) from about 20 to about 300 parts by weight of a plasticizer or blending agent based on 100 parts of the overpolymer, said plasticizer or blending agent comprising a copolymer of butadiene, and whereby said blend composition has a low temperature brittleness as measured by ASTM D-746 of less than or equal to about −17° C.

23. A flexible blend composition as set forth in claim 22, wherein plasticizer is a nitrile-butadiene copolymer.

24. A flexible bend composition as set forth in claim 1, wherein said graft component or overpolymer segment further comprises up to about 90 percent by weight of the graft component of an acrylate of the formula:

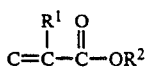

wherein $R^1$ is an aromatic, an aliphatic, or combinations thereof, having from 1 to 18 carbon atoms, or a halogen derivative thereof, or hydrogen; and $R^2$ is hydrogen or an aliphatic, an aromatic, an alkyl hydroxyl, or combinations thereof, or a halogen derivative thereof having from 1 to 18 carbon atoms; or a hydrocarbyl ether such as an alkoxyalkyl, a phenoxyaryl or a phenoxylakyl or combinations thereof, or a substituted halogen, oxygen, nitrogen, or sulfur derivative thereof having from 2 to 1,000 carbon atoms.

25. A flexible blend composition as set forth in claim 22, wherein said graft component or overpolymer segment further comprises up to about 90% by weight of the graft component of an acrylate of the formula:

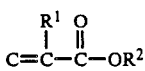

wherein $R^1$ is an aromatic, an aliphatic, or combination thereof, having from 1 to 18 carbon atoms, or a halogen derivative thereof, or hydrogen; and $R^2$ is hydrogen or an aliphatic, an aromatic, an alkyl hydroxyl, or combinations thereof, or a halogen derivative thereof having from 1 to 18 carbon atoms; or a hydrocarbyl ether such as an alkoxyalkyl, a phenoxyaryl or a phenoxyalkyl or combinations thereof, or a substituted halogen, oxygen, nitrogen or sulfur derivative thereof having from 2 to 1000 carbon atoms.

* * * * *